US006436216B1

(12) United States Patent
Grover

(10) Patent No.: US 6,436,216 B1
(45) Date of Patent: Aug. 20, 2002

(54) PRE-PACKAGING RELAXATION FOR LAMINATED ELASTIC WEBS

(75) Inventor: Paul C. Grover, Wauwatosa, WI (US)

(73) Assignee: Ato Findley, Inc., Wauwatosa, WI (US)

( * ) Notice: Subject to any disclaimer, the term of this patent is extended or adjusted under 35 U.S.C. 154(b) by 0 days.

(21) Appl. No.: 09/240,737

(22) Filed: Jan. 29, 1999

(51) Int. Cl.$^7$ .............................................. B32B 31/00
(52) U.S. Cl. ....................... 156/161; 156/164; 156/229; 156/436
(58) Field of Search ................................. 156/229, 161, 156/163, 164, 433, 436; 53/473

(56) References Cited

U.S. PATENT DOCUMENTS

| | | | |
|---|---|---|---|
| 4,229,473 A | 10/1980 | Elber | 428/113 |
| 4,581,269 A | 4/1986 | Tilman | 428/62 |
| 4,587,175 A | 5/1986 | Akao | 428/596 |
| 4,657,802 A | * 4/1987 | Morman | 156/163 |
| 4,863,779 A | 9/1989 | Daponte | 428/152 |
| 5,853,881 A | 12/1998 | Estey et al. | 428/373 |
| 5,861,074 A | 1/1999 | Wu | 156/229 |

FOREIGN PATENT DOCUMENTS

| | | | |
|---|---|---|---|
| EP | 0 420 256 | 3/1991 | |
| WO | WO 96/21562 | 7/1996 | |
| WO | WO 96/38620 | 12/1996 | |
| WO | WO 98/02300 | 1/1998 | |
| WO | WO 98/10919 | 3/1998 | |

* cited by examiner

*Primary Examiner*—Geoffrey L. Knable
(74) *Attorney, Agent, or Firm*—Andrus, Sceales, Starke & Sawall, LLP

(57) ABSTRACT

Laminated elastic webs are manufactured in a pre-stretched condition using a laminating machine. A conveyor system located downstream of the laminating machine conveys the laminated elastic webs to packaging machines (e.g. reject splicers and festooners). The conveyor system operates at speeds proportionally less than the line speed of the laminating machine so that the laminated elastic web relaxes from its stretched condition, and becomes fully or almost fully relaxed and gathered before packaging. Sufficient relaxation is important before packaging so that the laminated elastic web does not set in stretched form while packaged, or alternatively relax further while packaged to create dead space within the packaging container. The conveyor system preferably includes an inclined conveyor belt followed by a multi-lane air conveyor. Each lane of the air conveyor gently transports one of several laminated elastic webs from the belt conveyor to the respective packaging machine.

19 Claims, 4 Drawing Sheets

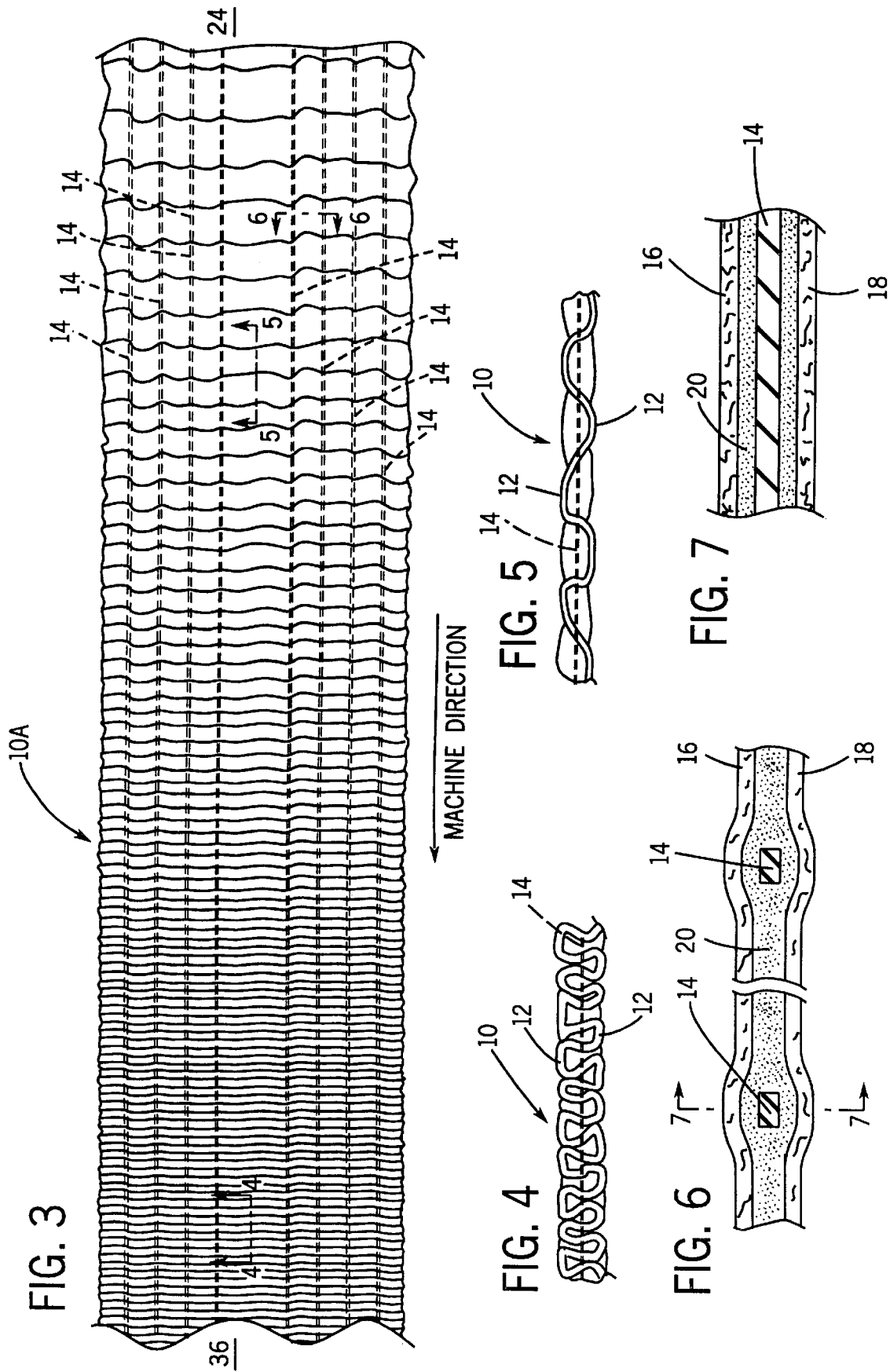

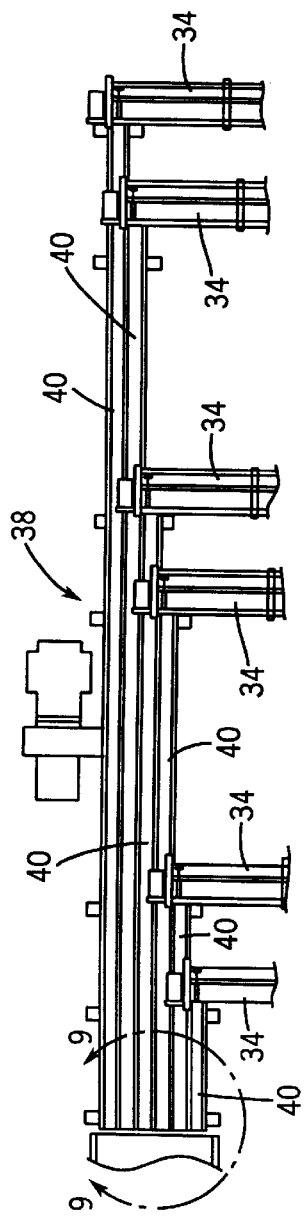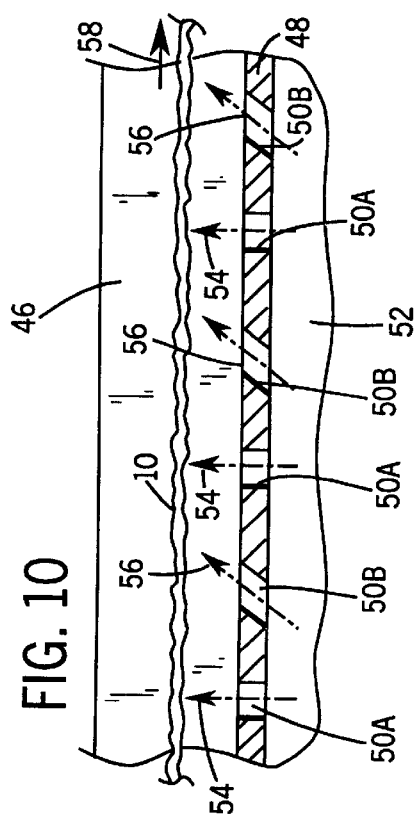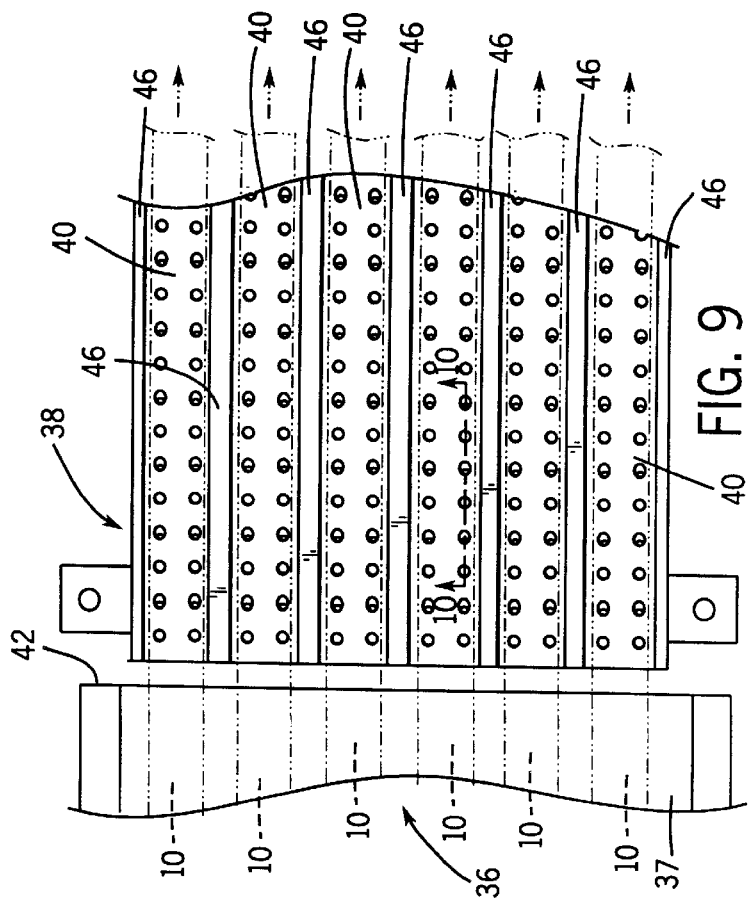

PRE-PACKAGING RELAXATION FOR LAMINATED ELASTIC WEBS

FIELD OF THE INVENTION

The invention relates to the packaging of prefabricated, laminated elastic webs that are useful in the construction of elasticized articles. Specifically, the invention relates to a method and apparatus for packaging a prefabricated, laminated elastic web that allows the elastic in the web to sufficiently relax prior to packaging.

BACKGROUND OF THE INVENTION

Many disposable or non-disposable articles have laminated elastic components forming one or more expandable or stretchable portions in the article. For example, laminated elastic waistbands are common. Typically, the laminated elastic component is comprised of two layers of nonwoven fabric having elastomeric strands adhered therebetween. The elastomeric strands are laminated to the nonwoven layers in a pre-stretched condition. When the elastomeric strands relax, the nonwoven material gathers. The machines and tooling required for integral fabrication of laminated elastic components are extremely complex. The invention was developed during attempts to manufacture prefabricated, laminated elastic webs off-site, as an alternative to integrally manufacturing laminated elastic components with the respective article.

Although manufacturing and attaching a prefabricated, laminated component to a disposable or non-disposable article appears to be a plausible alternative, substantial problems exist in the packaging and shipment of prefabricated, laminated elastic webs. For example, if the laminated elastic web is packaged in a stretched or semi-stretched state, relaxation during shipment and storage introduces dead space into the storage container. The dead space often causes shifting and tipping of the web within the storage container, thereby rendering the web difficult to use by the end user. Additionally, if the laminated elastic web is not sufficiently relaxed prior to packaging, extended storage of the web in a stretched condition can cause the elastic material to set in a stretched condition, thus causing the web to become defective.

It is an object of the invention to provide practical means for packaging prefabricated, laminated elastic webs in a relaxed condition.

SUMMARY OF THE INVENTION

The invention relates to an elastic relaxation method that is implemented prior to packaging a prefabricated, laminated elastic web. The method is typically accomplished through the use of a conveyor system which transports the laminated elastic web from a laminating machine downstream to a packaging apparatus. The conveyor system is designed so that the web is under little or no tension for an amount of time sufficient to fully or near fully relax the elastic material before packaging.

When the laminated elastic web is fabricated in the laminating machine, the elastic material (e.g. elastomeric strands, films, etc.) is stretched in the machine direction as the web passes from the exit nip of the machine. In order to stretch the elastic material in the laminating machine, the laminating machine subjects the elastic material to positive draw forces. In accordance with the invention, the elastic material is pre-stretched (i.e., a stretched relative length $L_S$) at least 150% of its relaxed length (i.e., relaxed relative length $L_R$), and when using the preferred materials, 340% of its relaxed length $L_R$. The conveyor system is located downstream of the laminating machine and receives the laminated elastic web from the exit nip of the laminating machine. The conveyor system operates at one or more speeds that are less than the line speed of the laminating machine, thereby subjecting the laminated elastic web to negative draw force downstream of the exit nip for the laminating machine. The negative draw force in combination with the dwell time prior to packaging causes the elastic material to relax and the laminated elastic web to gather prior to packaging.

In accordance with the invention, the dwell time before packaging while the web is being transported should be sufficient to allow the prefabricated, laminated elastic web to gather to a relative length of no more than a maximum relative packaging length $L_P$. The maximum relative packaging length $L_P$ is preferably defined by the following expression:

$$L_P \leq (1-\alpha)L_S + \alpha L_G$$

where $L_S$ is the relative length of the stretched web when the elastic material is laminated to the web in the laminating machine, $L_G$ is the relative length of a completely gathered web, $\alpha$ is a packaging relaxation coefficient (preferably, $0.75 \leq \alpha \leq 1.00$); and $L_P$ is the maximum relative packaging length of the laminated elastic web.

In its preferred embodiment, the method is carried out using a conveyor system comprising an inclined conveyor belt followed by an air conveyor. In a system in which the elastic components are pre-stretched 340%, the preferred operating speed for the conveyor belt is approximately 39% of the line speed of the laminating machine. The preferred transport speed by the air conveyor is substantially the same as the preferred speed of the belt conveyor.

To those skilled in the art, it should be apparent that the substantial reduction in speed as the laminated elastic web approaches the belt conveyor causes a significant negative draw force or ram force at normal operating speeds (i.e. 300 meters per minute) which in turn facilitates immediate relaxation of the elastic web. On the other hand, when the line speed of the laminating machine is slower, the negative draw or ram force on the laminated elastic web as it approaches the belt conveyor is reduced. Therefore, the invention relies on having a sufficient amount of dwell time while the laminated elastic web is under little or no tension as it is being conveyed to the packaging apparatus to allow for appropriate relaxation and gathering.

In another aspect, the invention is embodied in an apparatus comprising a laminating machine that fabricates a plurality of laminated elastic webs, a belt conveyor that conveys the plurality of webs from the laminating machine downstream to an air conveyor, and a plurality of packaging machines positioned downstream of the air conveyor. The air conveyor has a plurality of individual lanes, each receiving one of the plurality of laminated elastic webs from the belt conveyor. The lanes of the air conveyor gently convey the respective web by blowing air at a low flow rate against a bottom side of the web to slightly lift the web and move the web forward along the lane through the use of directional flow. Each lane conveys the respective laminated elastic web to a dedicated packaging system. The preferred packaging system consists of a reject splicer followed by a festooner which packages the web in layers within a box or other shipping container. An air conveyor having multiple lanes is an especially practical means for gently transporting the relaxed and gathered laminated elastic web from the belt conveyor to the respective packaging system.

Various other features, objects and advantages of the invention will be apparent to those skilled in the art upon reviewing the following drawings and description thereof.

BRIEF DESCRIPTION OF THE DRAWINGS

The drawings illustrate the best mode presently contemplated of carrying out the invention.

In the drawings:

FIG. 3 is a top view of the laminated elastic web shown in FIG. 1, illustrating various degrees of stretching of the laminated elastic web as the elastic in the web relaxes;

FIG. 4 is a partial section view taken along line 4—4 of FIG. 3 illustrating the laminated elastic web in a relatively gathered condition;

FIG. 5 is a partial section view taken along line 5—5 of FIG. 3 illustrating the laminated elastic web in a stretched condition;

FIG. 6 is a partial section view taken along line 6—6 in FIG. 3 which illustrates and exaggerates the adhesive bond between the two layers of fabric and elastic strands extending therethrough;

FIG. 7 is a partial section view taken along line 7—7 of FIG. 6 further illustrating the elastic strand retained between the two layers of fabric;

FIG. 8 is a top view illustrating a multiple lane air conveyor used in the preferred embodiment of the invention;

FIG. 9 is a detailed view of the area identified by line 9—9 in FIG. 8, further illustrating the individual lanes of the air conveyor;

FIG. 10 is a sectional view taken along line 10—10 of FIG. 9 illustrating air flow supporting and transporting the laminated elastic web through the lanes of the air conveyor.

DETAILED DESCRIPTION OF THE INVENTION

Figure 1:
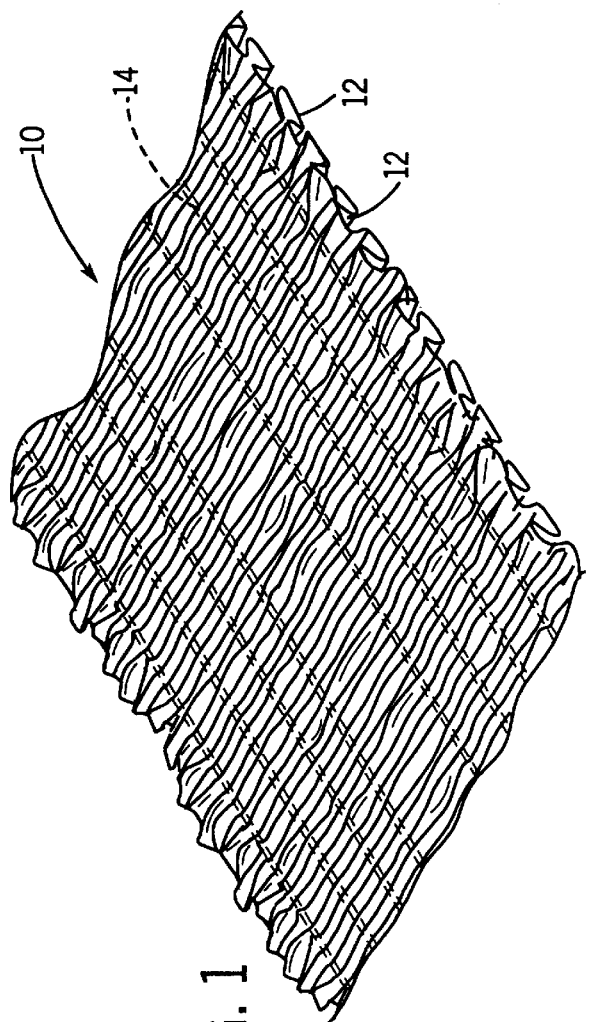
FIG. 1 is a perspective view of a prefabricated, laminated elastic web which is packaged in accordance with the present invention.

FIG. 1 illustrates a strip of a prefabricated, laminated elastic web 10 constructed in accordance with the invention. Although only a portion of the laminated elastic web 10 is shown in FIG. 1, it should be understood that the prefabricated, laminated elastic web 10 has a continuous length that is later cut to a desired length by the end user. In its preferred embodiment, the laminated elastic web 10 is approximately two inches wide although the width of the laminated elastic web 10 can vary depending on the application. In the preferred embodiment of the invention, the laminated elastic web 10 includes eight individual elastomeric strands 14 extending longitudinally along the continuous length of the web 10. Eight (8) elastomeric strands 14 are sufficient to provide the required elasticity for a laminated web 10 having a two (2) inch width. It should be understood that a larger or smaller number of elastomeric strands 14 can be used in accordance with the invention, depending upon the particular end use for the laminated elastic web 10. In the preferred embodiment, the elastomeric strands 14 are individual strands of Lycra®, commercially available from DuPont. It is contemplated that other types of elastic materials could be substituted for the elastomeric strands 14, such as various elastic films, threads or adhesives.

Referring now in particular to FIG. 6, the laminated elastic web 10 preferably includes an inner fabric layer 16 and an outer fabric layer 18. It should be pointed out that the invention is not limited to laminates having two fabric layers. The relaxing technique disclosed herein can be used for laminated elastic webs having more than two fabric layers, or even for a laminated elastic web having a single fabric layer. In the preferred configuration shown in FIG. 6, the inner fabric layer 16 and the outer fabric layer 18 captures the elastic strands 14 therebetween. In some cases, the inner fabric layer 16 and the outer fabric layer 18 can be dissimilar types of nonwoven fabric. As a specific example, the preferred inner fabric layer 16 can be a spun-bonded, nonwoven material available from Fiberweb under the brand name SOFSPAN 200. This material is relatively soft to the touch and comfortable when placed against the skin. The outer fabric layer 18 can be a less expensive, nonwoven material. Where cost considerations are not critical, the inner fabric layer 16 and the outer fabric layer 18 can be formed from the same material.

Referring to FIGS. 6 and 7, the elastomeric strands 14 are retained between the inner fabric layer 16 and the outer fabric layer 18 by adhesive 20. The elastomeric strands 14 are adhered both to the inner fabric layer 16 and the outer fabric layer 18. Suitable adhesives 20 have the proper adhesive properties to prevent the elastomeric strands 14 from slipping between the fabric layers 16 and 18. Additionally, the selected adhesive 20 should provide an adequate bond to adhere the inner fabric layer 16 to the outer fabric layer 18. In the preferred embodiment of the invention, the adhesive 20 is a pressure-sensitive, hot-melt adhesive, such as Product No. H2385-01, available from Ato Findley, Inc., the assignee of the present invention. During fabrication, a layer of adhesive is sprayed on the surface of each fabric layer 16, 18. The adhesive 20 must have an appropriate "open" time, which is the period of time from application of the adhesive until the adhesive sets, to provide adequate adhesion and eliminate slippage of the elastomeric strands 14.

Figure 2:
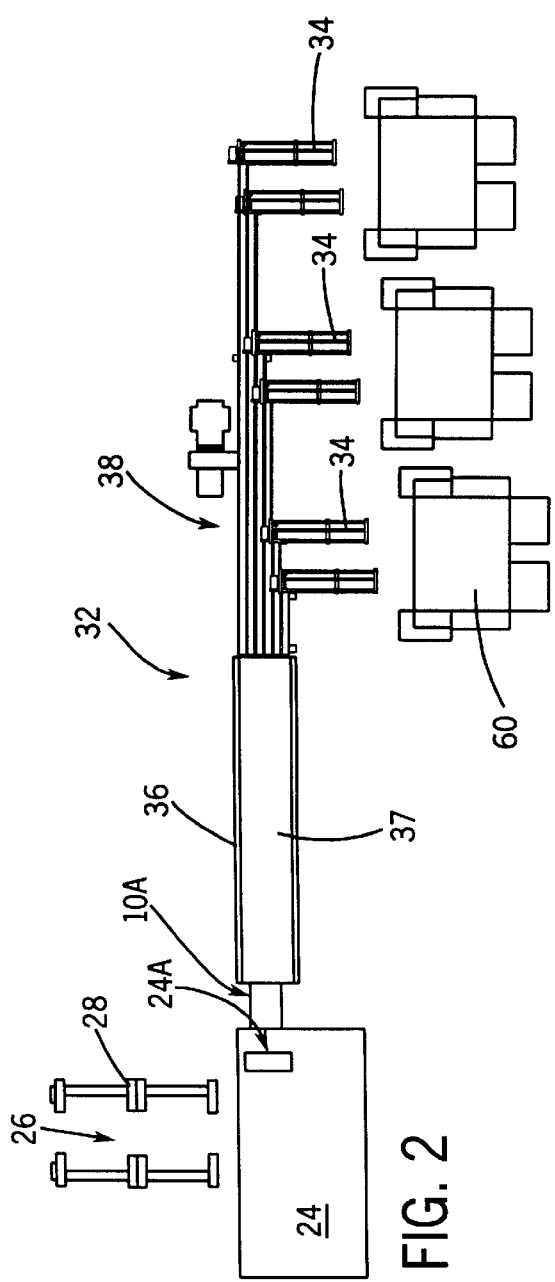
FIG. 2 is a general schematic diagram illustrating the apparatus used in making and packaging the laminated elastic web shown in FIG. 1.

FIG. 2 illustrates a machinery line for making and packaging a prefabricated, laminated elastic web 10 in accordance with the invention. The laminated elastic web 10 is packed into containers for shipping, such as cardboard boxes or similar structures. As mentioned, it is important that the prefabricated, laminated elastic web 10 be packaged in a completely gathered state or nearly completely gathered state. Further relaxation while the laminated elastic web 10 is stored in the packaging container can cause dead space which is not desirable for storing and shipping. Alternatively, the stretched elastic may set in a stretched state if it is not sufficiently relaxed. In accordance with the invention, the machines in FIG. 2 are operated in such a manner that the laminated elastic web 10 is sufficiently relaxed before packaging.

Referring to FIG. 2, a laminating machine 24 receives elastomeric strands 14 from an elastomeric strand unwind 26. The elastomeric strand unwind 26 includes a plurality of spools 28 for dispensing the individual elastomeric strands 14. The elastomeric strands 14 are pulled from the spools 28, and are pre-stretched to at least 150% of their relaxed length. In the preferred embodiment of the invention, the elastomeric strands 14 are pre-stretched to approximately 340% of their relaxed length.

Once pre-stretched, the elastomeric strands 14 are fed into the laminating machine 24. The laminating machine 24 operates at a line speed which is preferably 300 feet/minute, but can be adjusted depending on conditions. The inner and outer fabric layers 16 and 18 are each fed into the laminating machine 24 at the line speed by a fabric feeding assembly (not shown). Preferably, the inner and outer fabric layers 16, 18 are webs of nonwoven material having a width of approximately 18 inches. The webs are eventually sliced in the laminating machine 24 to form six laminated webs each having a width of three inches. Each two inch laminated web preferably contains eight (8) elastomeric strands 14. Therefore, forty-eight (48) individual elastomeric strands 14 are fed from the elastomeric strand unwind 26 to the laminating machine 24. The adhesive 20 (FIG. 6) is applied to either one or both of the fabric layers 16 and 18 within the laminating machine 24. Once the adhesive layer 20 is applied, and before the fabric layers 16, 18 come into contact with each other, the pre-stretched elastic strands 14 are positioned between the fabric layers 16, 18. The fabric layers 16, 18 (with the elastic strands 14 therebetween) are then placed in contact with each other and compressed to form a laminated elastic web 10. The "open time" for the adhesive in the adhesive layer 20 must be long enough to receive the elastic strands 14 before setting. As is known in the art, the adhesive "open time" is dependent on the type of adhesive, the amount applied, and the application temperature.

In the laminating machine 24, the laminated elastic webs 10 are formed with the elastomeric strands in a fully stretched condition, such that there are no gathered portions 12 in the web 10. The laminating machine 24 applies a positive draw force on the web 10 which maintains the elastomeric strands 14 in the pre-stretched condition while the adhesive 20 sets. The "open time" of the pressure-sensitive, hot-melt adhesive must be sufficiently short to allow the adhesive to substantially set prior to the web 10 leaving an exit nip on the laminating machine 24, at which point the tension (or positive draw) is released.

As mentioned, the laminating machine 24 preferably forms a plurality of narrow webs of the prefabricated, laminated elastic material 10 (i.e., by slicing a larger 18 inch web into six (6) two inch webs). The six narrow webs 10 are aligned next to each other as the webs 10 exit the lamination machine 24 in a stretched state. Upon leaving the laminating machine 24, the laminated elastic webs 10 are fed onto a conveyor system 32 that supports and transports the laminated elastic webs 10 from the laminating machine 24 to one of several packaging machines 34. The conveyor system 32 includes a belt conveyor 36 and an air conveyor 38.

From the exit nip on the laminating machine 24, each laminated elastic web 10 approaches and then loads the belt conveyor 36. The belt conveyor 36 includes a moving endless conveyor belt 37 that is operated at a speed less than the line speed of the laminating machine 24. The reduction in speed creates a negative draw force or ram force on the laminated elastic webs 10 as the webs 10 approach the conveyor belt 36. The negative draw force or ram force facilitates sudden contraction of the laminated elastic webs 10, and gathering of the fabric layers 16, 18 and relaxation of the elastic strands 14. Normally, however, sufficient relaxation is not complete at this point in the process. FIG. 3 is a schematic drawing illustrating the various degrees of gathering as the laminated elastic web travels from the exit nip 24A (FIG. 2) on the laminating machine 24 to the belt conveyor 36, as depicted by reference numeral 10A on FIG. 2.

The laminated elastic web 10 is manufactured by laminating stretched elastic strands 14 between two layers of fabric 16, 18. See FIGS. 1, 3 and 7. In the gathered condition (as shown in FIG. 4), upper and lower gathered portions 12 of fabric 16, 18 are closely bunched together. FIG. 5 illustrates the laminated elastic web 10 in a more stretched condition. In FIG. 5, the gathered portions 12 are spaced farther from one another than in FIG. 6, which means that the relative length of the laminated elastic web 10 is greater in FIG. 5 than in FIG. 6.

The speed of the belt 37 in the belt conveyor 36 should be carefully selected for numerous reasons. Slower belt conveyor 36 operation promotes relaxation; however, if the belt conveyor 36 is too slow (compared to the laminating machine line speed), the laminated elastic webs 10 will begin to bunch up, overlap and possibly tangle when being transported on the belt conveyor assembly 36. In the preferred embodiment of the invention, the elastomeric strands 14 are pre-stretched to approximately 340% of their relaxed length and the optimal relative speed of the belt conveyor 36 is approximately 39% of the line speed of the laminating machine 24. Thus, if the speed of the laminating machine 24 is approximately 300 meters/minute, the preferred speed of the belt conveyor assembly 36 is approximately 117 meters/minute. It is important to note that the speed of the conveyor 36 is preferably adjusted proportionally (e.g. 39%) to the line speed of the laminating machine 24, even when the laminating machine 24 is slowed down from typical line speed (e.g. during in-feed splicing, or reject splicing, etc.). It is also important to note that the ratio of the belt conveyor 36 speed to the line speed of the laminating machine 24 may be substantially greater than or less than 39% depending on the elastomeric material used and the amount that it is pre-stretched when fabricating the web 10. Although the amount of relaxation is approximately linearly related to the relative speed of the belt conveyor 36 compared to the line speed of the laminating machine 24, the relationship is not strictly linear. The preferred speed of the belt conveyor 36 should be determined experimentally for each particular laminated elastic web and line speed. The preferred speed of the belt conveyor 36 can change substantially depending on materials and degrees of pre-stretch.

In the preferred embodiment of the invention, the belt conveyor 36 is inclined at an upward angle relative to the exit of the laminating machine. The primary reason for the inclined belt conveyor 36 is to raise the height of the laminated elastic webs to the height of the intake locations for the packaging stations 34. Upon exiting the belt conveyor assembly 36, the laminated elastic webs 10 load onto an air conveyor 38 which loads the packaging stations 34. As can be seen in FIG. 8, the air conveyor 38 has multiple lanes 40, each terminating at one of the packaging stations 34.

Referring now to FIG. 9, the air conveyor 38 is aligned with the downstream end 42 of the belt conveyor 36 such that the laminated elastic webs 10 being transported by the conveyor belt 37 are aligned within a respective lane 40 on the air conveyor 38. Guides 46 separate the individual lanes 40 and direct the webs 10 in the forward direction.

As illustrated in FIG. 10, each lane 40 of the air conveyor 38 includes a bottom wall 48 having a series of air holes 50 formed therein. The air holes 50 are in communication with a supply of pressurized air that is introduced into a plenum 52 located below the bottom wall 48. Two types of air holes 50 are formed in the bottom wall 48. The first type of air hole 50A directs the flow of pressurized air straight upward, as indicated by arrows 54. The second type of air hole 50B directs the supply of pressurized air in an angled direction both upward and forward, as shown by arrows 56. The angled air holes 50B that direct pressured air in the direction of arrows 56 causes the laminated elastic web 10 to move gently in a downstream direction, as indicated by arrow 58. In this manner, each lane 40 of the air conveyor 38 supports the respective laminated elastic web 10 on a bed of pressurized air while at the same time directs the pressurized air to move the web 10 downstream. Under normal operating conditions, a small flow of air is adequate to move the web 10 at the appropriate speed. In the preferred embodiment of the invention, the air conveyor 38 moves the laminated elastic webs 10 downstream at the same speed as the belt conveyor 36 speed. For example, at a relative speed of 39% of laminating machine 24 line speed for a pre-stretch of 340% using the preferred materials described earlier.

As shown in FIG. 8, each lane 40 of the air conveyor assembly 38 serves a dedicated packaging station 34. The packaging stations 34 are staggered along the length of the air conveyor 38, such that the length of the shortest lane 40 is significantly less than the length of the longest lane 40. If a conventional conveyor belt assembly were substituted for each lane 40 of the air conveyor 38, a sophisticated mechanical drive system would be required. Preferably, each laminated elastic web 10 is relaxed to its desired length upon reaching the dedicated packaging station 34. However, it is also contemplated that the packaging stations 34 be operated at a slightly slower speed to facilitate additional relaxation if needed.

The preferred packaging station 34 includes a reject splicer that receives the respective web from the individual lane of the air conveyor 38. The operator of the reject splicer performs a quality assurance check on the respective web. The reject splicer rejects any portion of the web that does not meet manufacturing specifications and outputs a continuous web. In the preferred embodiment of the invention, the reject splicer operates at approximately 38% of the line speed of the laminating station 24. Since the reject splicer is operated slightly slower than the air conveyor 32, the reject splicer may introduce a slight amount of further relaxation into the elastic material 10.

The preferred packaging station 34 also includes a conventional festooner 60. The festooners 60 receive the respective laminated elastic webs from the associated reject splicer, and packs the web in a conventional container, such as a cardboard box, in layers. In the preferred embodiment of the invention, the festooner 60 is operated at a speed slightly slower than the speed of the reject splicer, such that the festooner 60 may introduce slightly more relaxation into the laminated elastic web 10. Specifically, the festooner 60 is operated at approximately 37.5% of the line speed of the laminating machine 24. Although packaging of the elastic material 10 has been described as including festooning the material into a box, it is contemplated that other types of packaging, such as winding rolls of the laminated elastic web can also be used in accordance with the invention.

Preferably, it is desired that the laminated elastic web 10 be at least about 90% fully gathered prior to being placed in the packaging container. It is important that the laminated elastic web 10 be nearly fully relaxed prior to packaging, otherwise later relaxation in the packaging container may cause tipping or inefficient packaging of the laminated elastic web 10. Additionally, if the laminated elastic web 10 is packaged without being properly relaxed, extended storage can cause the elastic to set in a slightly stretched condition, thereby rendering the product defective.

In addition to the relative speed at which the conveyor system 32 operates compared to the line speed of the laminating machine 24, the length of the conveyor system 32 or "dwell time" is important for introducing a sufficient amount of relaxation. In the preferred embodiment of the invention, the belt conveyor 36 is 30 feet long. Additionally, the shortest lane of the air conveyor assembly 38 is 10 feet in length. Therefore, the combined effective length of the conveyor system 32 is at least 40 feet. It has been found that this length provides adequate relaxation for laminating machine line speeds ranging from 150 meter/minute to 300 meters/minute, when the preferred elastic material is pre-stretched to 340%.

Figure 11:
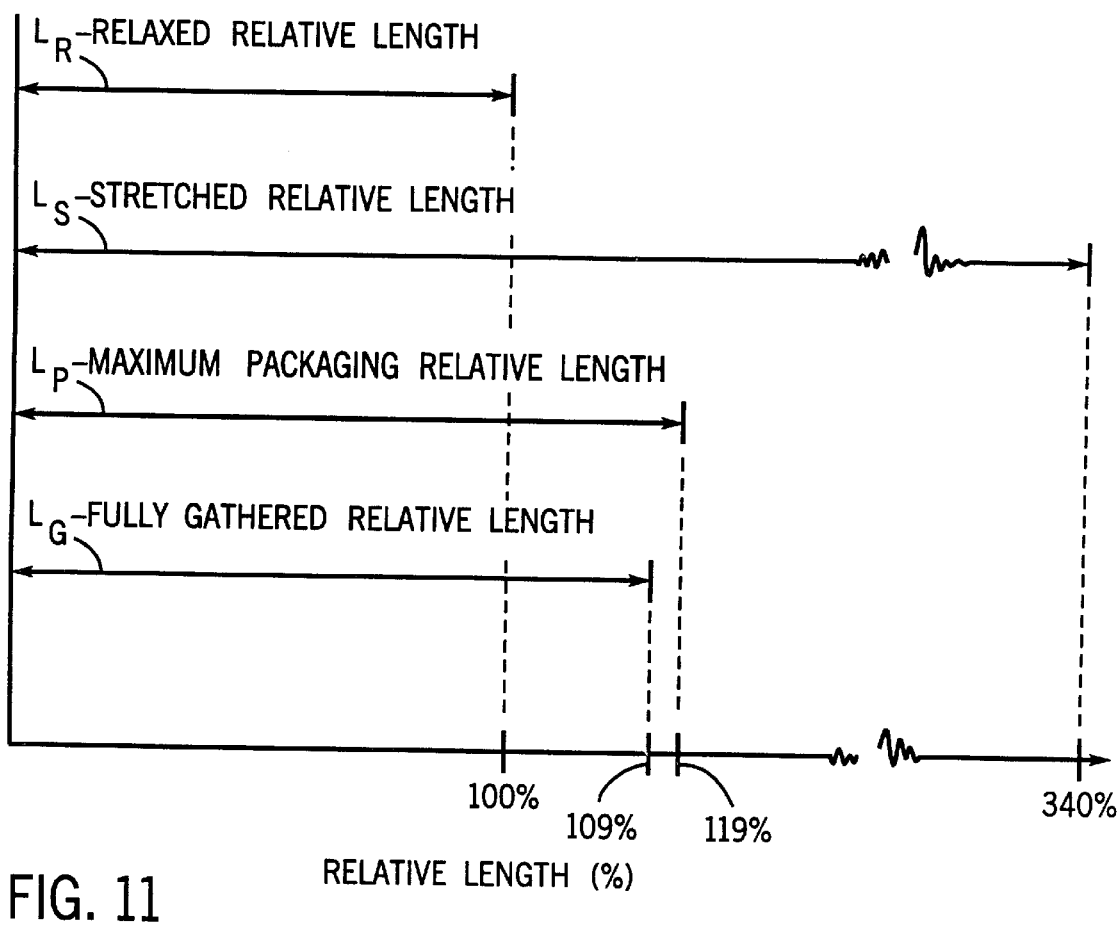
FIG. 11 is a schematic drawing illustrating relative web length variations during the fabrication and packaging of a laminated elastic web in accordance with the invention.

In order to provide sufficient relaxation of the elastomeric material before packaging, the packaging of the laminated elastic web should be delayed for an amount of time selected to allow the prefabricated web to gather to a relative length no longer than a predetermined maximum packaging relative length $L_P$. Determination of the maximum packaging relative length $L_P$ is described in connection with FIG. 11 which is a plot of relative web lengths during the fabrication and packaging process of a prefabricated, laminated elastic web in accordance with the preferred embodiment of the invention. In FIG. 11, the relative length depicted by arrow labeled $L_R$ is the relaxed relative length of the elastic material in the laminated elastic web. The relaxed relative length $L_R$ is assigned a value of 100% in FIG. 11. As previously mentioned, the elastic material (preferably elastomeric strands) is stretched preferably to 340% in the machine direction at the time it is laminated to the outer nonwoven webs. The relative length depicted by arrow labeled $L_S$ in FIG. 11 depicts the stretched relative length. Once the elastomeric material is securely laminated within the outer layers of fabric, the positive draw forces on the web are reduced, thus allowing relaxation of the elastic material and gathering of the laminated elastic web. In accordance with the invention, the packaging of the laminated elastic web should be delayed until the relative length of the web is no greater than a preselected maximum packaging relative length $L_P$. In FIG. 11, the maximum packaging relative length $L_P$ is illustrated by arrow labeled $L_P$ which has a preferred relative length of 119%. This is the preferred maximum packaging relative length $L_P$ of a laminated elastic web fabricated using the preferred materials. In FIG. 11, relative length depicted by the arrow labeled $L_G$ illustrates the relative length of the fully gathered prefabricated laminated elastic web. As shown in FIG. 11, the fully gathered relative length $L_G$ of a laminated elastic web fabricated with the preferred materials is approximately 109%. The difference between the packaging relative length $L_P$ and the fully gathered relative length $L_G$ reflects the reality that a slight amount of relaxation and gathering normally occurs after packaging. Nonetheless, such a slight amount of further relaxation and gathering is relatively insignificant with respect to packaging efficiency, and is unlikely to produce a defective set in the elastomeric material.

It should be apparent to those skilled in the art that the selection of the "dwell time" before packaging, or in other words, the selection of the maximum packaging relative length $L_P$ is highly dependent on the specific materials used to fabricate the laminated elastic web. For example, the properties of the outer fabric layers as well as the elastomeric material and adhesive can have a significant effect on the preferred values for the stretched relative length $L_S$, the fully gathered relative length $L_G$, and also the relationship of $L_S$ and $L_G$ to the maximum packaging relative length $L_P$. The maximum packaging relative length $L_P$ should be determined in accordance with the following expression:

$$L_P \leq (1-\alpha)L_S + \alpha L_G$$

where α is a packaging relaxation coefficient. The preferred range for the relaxation packaging coefficient a is given by the following expression:

$$0.75 \leq \alpha \leq 1.00$$

Various alternatives and embodiments are contemplated as being within the scope of the following claims particularly pointing out and distinctly claiming the subject matter regarded as the invention.

I claim:

1. A method of making and packaging a prefabricated, laminated elastic web, the method comprising the steps of:

operating a laminating machine at a line speed to fabricate a laminated elastic web, the laminating machine applying a positive draw force on the laminated elastic web in the machine direction to maintain said laminated elastic web in an initial stretched condition as the web passes from the laminating machine;

transporting the laminated elastic web downstream from the laminating machine at sequentially diminishing speeds that are less than the line speed of the laminating machine so that the laminated elastic web gradually relaxes in stages from its initial stretched condition and becomes gathered to at least 90% of its relaxed condition before packaging, the step of transporting the web downstream including (1) using a conveyor system to gradually allow said laminated elastic web to contract by running said conveyor system at a line speed which is less than the line speed of said laminating machine for a predetermined amount of dwell time to allow said laminated elastic web to relax to a second stretched condition which is less than said initial stretched condition, and thereafter (2) using a packaging system to gradually allow said laminated elastic web to further contract by running said packaging system at a line speed which is less than the line speed of said conveyor system for a predetermined amount of dwell time to allow said laminated elastic web to relax to a third stretched condition which is less than said second stretched condition; and packaging the laminated elastic web.

2. A method as recited in claim 1 wherein the laminated elastic web comprises at least one layer of nonwoven material to which pre-stretched elastomeric strands are adhered thereto in the laminating machine.

3. A method as recited claim 2 wherein:

the pre-stretched elastomeric strands are pre-stretched to approximately 340% of their relaxed length when the strands are adhered to said layer of nonwoven material; and the speed of the conveyor system is no more than approximately 39% of the line speed of the laminating machine.

4. A method as recited in claim 2 wherein a pressure-sensitive, hot-melt adhesive is used to adhere the pre-stretched elastomeric strands to said layer of nonwoven material.

5. A method as recited in claim 1 wherein:

the conveyor system includes a belt conveyor and an air conveyor;

the belt conveyor receives the laminated elastic web from the exit nip on the laminating machine and transports the laminated elastic web to the air conveyor; and the air conveyor receives the laminated elastic web from the belt conveyor and transports the laminated elastic web to the packaging system.

6. A method as recited in claim 5 wherein the belt conveyor is operated to transport the laminated elastic web at a belt conveyor speed which is substantially the same as the speed in which the air conveyor transports the laminated elastic web.

7. A method as recited in claim 5 wherein the air conveyor gently transports the laminated elastic web by blowing air at a low flow rate against a bottom side of the laminated elastic web to suspend the web above the surface of the air conveyor and to also move the web in the forward direction along the air conveyor.

8. A method as recited in claim 5 wherein the length of the belt conveyor is at least 30 feet.

9. A method as recited in claim 1 wherein the packaging system comprises a reject splicer and a festooner which packs the relaxed and gathered laminated elastic web in a shipping container.

10. A method as recited in claim 1 wherein the laminated elastic web comprises first and second layers of nonwoven material to which pre-stretched individual strands are adhered thereto and therebetween.

11. A method as recited in claim 1 wherein:

the line speed of the laminating machine is adjustable between a minimum line speed and a maximum line speed; and the minimum line speed is selected to provide for sufficient relaxation of the laminated elastic web during the dwell time of the laminated elastic web on the conveyor system and also to provide a suitable adhesive open time to provide for sufficient adhesion of the layers of the laminated elastic web.

12. A method of making and packaging a prefabricated, laminated elastic web, the method comprising the steps of:

feeding a web of fabric through a laminating machine in a machine direction and at a desired line speed;

feeding elastomeric material into the laminating machine and aligning the elastomeric material with the web of fabric as the web of fabric passes through the laminating machine in the machine direction, the elastomeric material having a relaxed relative length of $L_R$;

subjecting the elastomeric material to positive draw forces as the elastomeric material passes through the laminating machine in alignment with the web of fabric such that the elastomeric material has a stretched relative length $L_S$ in the machine direction that is at least 50% greater than the relaxed relative length $L_R$ of the elastomeric material;

applying adhesive and compression forces to laminate the elastomeric material to the web of fabric when the elastomeric material is stretched to the stretched relative length $L_S$ thereby creating a prefabricated, laminated elastomeric web in which the elastomeric material in the web is stretched to an initial stretched condition having a relative length $L_S$;

conveying the prefabricated, laminated elastic web downstream from the laminating machine to allow gathering of the web by gradual relaxation of the elastomeric material in the web in stages by transporting the laminated elastic web at a second line speed which is less than the line speed of said laminating machine for a first dwell time to permit said laminated elastic web to relax to a second stretched condition which is less than said initial stretched condition, and thereafter transporting the laminated elastic web at a third line speed which is less than said second line speed for a second dwell time to permit said laminated elastic web to relax to a third stretched condition which is less than said second stretched condition;

delaying packaging of the prefabricated, laminated elastic web for a total amount of dwell time selected to allow the prefabricated, laminated elastic web to gather to at least 90% of its relaxed condition, said laminated elastic web having a relative length that is no more than a maximum packaging relative length $L_P$, the maximum packaging relative length $L_P$ being defined in accordance with the following expression:

$$L_P \leq (1-\alpha)L_S + \alpha L_G$$

where $L_S$ is the stretched relative length of the elastomeric material, $L_G$ is the relative length of the prefabricated, laminated elastic web after full gathering, $\alpha$ is a packaging relaxation coefficient, and $L_P$ is the maximum packaging relative length; and packaging the gathered web after the prefabricated, laminated elastic web has been allowed to gather to a relative length less than or equal to the relative packaging length $L_P$.

13. A method as recited in claim 12 further comprising the step of:

feeding a second web of fabric through the laminating machine in the machine direction, wherein the second web of fabric is aligned with the first web of fabric and the elastomeric material passing through the laminating machine, and the elastomeric material is located between the first and second web of fabric; and wherein the application of adhesive and compression forces laminate the elastomeric material between the first and second web of fabric when the elastomeric material is stretched to the stretched relative length $L_S$, thereby creating the prefabricated, laminated elastic web.

14. A method as recited in claim 12 wherein the adhesive is a hot-melt adhesive.

15. A method as recited in claim 12 wherein the web of fabric is a web of nonwoven fabric.

16. A method as recited in claim 12 wherein the prefabricated, laminated elastic web is packaged at near zero tension.

17. A method as recited in claim 12 wherein the packaging relaxation coefficient $\alpha$ is selected in accordance with the following expression:

$$0.75 \leq \alpha \leq 1.00$$

18. A method as recited in claim 12 wherein the elastomeric material consists of a plurality of elastic strands.

19. A method as recited in claim 12 wherein the step of packaging comprises a reject splicer and a festooner which packs the relaxed and gathered prefabricated, laminated elastic web in a shipping container.

* * * * *